United States Patent
Matsumoto

(10) Patent No.: US 12,010,445 B2
(45) Date of Patent: Jun. 11, 2024

(54) IMAGING ELEMENT AND IMAGING DEVICE WITH COMPARISON UNITS FOR COMPARING PHOTOELECTRIC SIGNALS WITH A REFERENCE SIGNAL

(71) Applicant: NIKON CORPORATION, Tokyo (JP)

(72) Inventor: Shigeru Matsumoto, Sagamihara (JP)

(73) Assignee: NIKON CORPORATION, Tokyo (JP)

( * ) Notice: Subject to any disclaimer, the term of this patent is extended or adjusted under 35 U.S.C. 154(b) by 37 days.

(21) Appl. No.: 17/442,911

(22) PCT Filed: Mar. 27, 2020

(86) PCT No.: PCT/JP2020/014103
§ 371 (c)(1),
(2) Date: Nov. 18, 2021

(87) PCT Pub. No.: WO2020/203799
PCT Pub. Date: Oct. 8, 2020

(65) Prior Publication Data
US 2022/0182568 A1    Jun. 9, 2022

(30) Foreign Application Priority Data

Mar. 29, 2019   (JP) ................ 2019-069145

(51) Int. Cl.
*H04N 25/75*    (2023.01)
*H04N 25/704*    (2023.01)

(52) U.S. Cl.
CPC ........... *H04N 25/75* (2023.01); *H04N 25/704* (2023.01)

(58) Field of Classification Search
CPC ...... H04N 25/75; H04N 5/378; H04N 25/704; H04N 5/36961; H04N 25/46; H04N 5/347
See application file for complete search history.

(56) References Cited

U.S. PATENT DOCUMENTS

2008/0284888 A1* 11/2008 Kobayashi ............ H04N 25/76
                                                              348/E3.018
2010/0214462 A1   8/2010   Itakura
(Continued)

FOREIGN PATENT DOCUMENTS

| JP | 2008-294913 A | 12/2008 |
| WO | 2017/018215 A1 | 2/2017 |
| WO | 2018163873 A1 | 9/2018 |

OTHER PUBLICATIONS

Nov. 11, 2022 Extended European Search Report issued in European Patent Application No. 20783884.8.
(Continued)

*Primary Examiner* — Nicholas G Giles
(74) *Attorney, Agent, or Firm* — Oliff PLC

(57) ABSTRACT

An imaging element includes a first photoelectric conversion unit and a second photoelectric conversion unit that generates electric charges by photoelectric conversion, a first comparison unit that outputs a first signal based on a result of comparing a signal based on electric charges generated by the first photoelectric conversion unit and a reference signal, a first storage unit that stores a signal based on the first signal that is output by the first comparison unit, a second comparison unit that outputs a second signal based on a result of comparing a signal based on electric charges generated by the second photoelectric conversion unit and a reference signal, a second storage unit that stores a signal based on the second signal that is output from the second comparison unit, and a connection unit that connects or disconnect the first comparison unit and the second storage unit.

22 Claims, 10 Drawing Sheets

(56) References Cited

U.S. PATENT DOCUMENTS

2013/0075588 A1* 3/2013 Kawaguchi ............ H04N 25/70
                                                      250/208.1
2018/0152650 A1  5/2018 Sakakibara et al.
2020/0228738 A1  7/2020 Ogawa et al.

OTHER PUBLICATIONS

Oct. 4, 2022 Office Action issued in Japanese Patent Application No. 2021-512015.
Jun. 23, 2020 International Search Report issued in International Patent Application No. PCT/JP2020/014103.
Jun. 23, 2020 Written Opinion of the International Searching Authority issued in International Patent Application No. PCT/JP2020/014103.
Aug. 9, 2023 Office Action issued in Chinese Patent Application No. 202080031798.X.
Jan. 19, 2024 Office Action issued in Chinese Patent Application No. 202080031798.X.
Feb. 21, 2024 Office Action issued in European Patent Application No. 20783884.8.

* cited by examiner

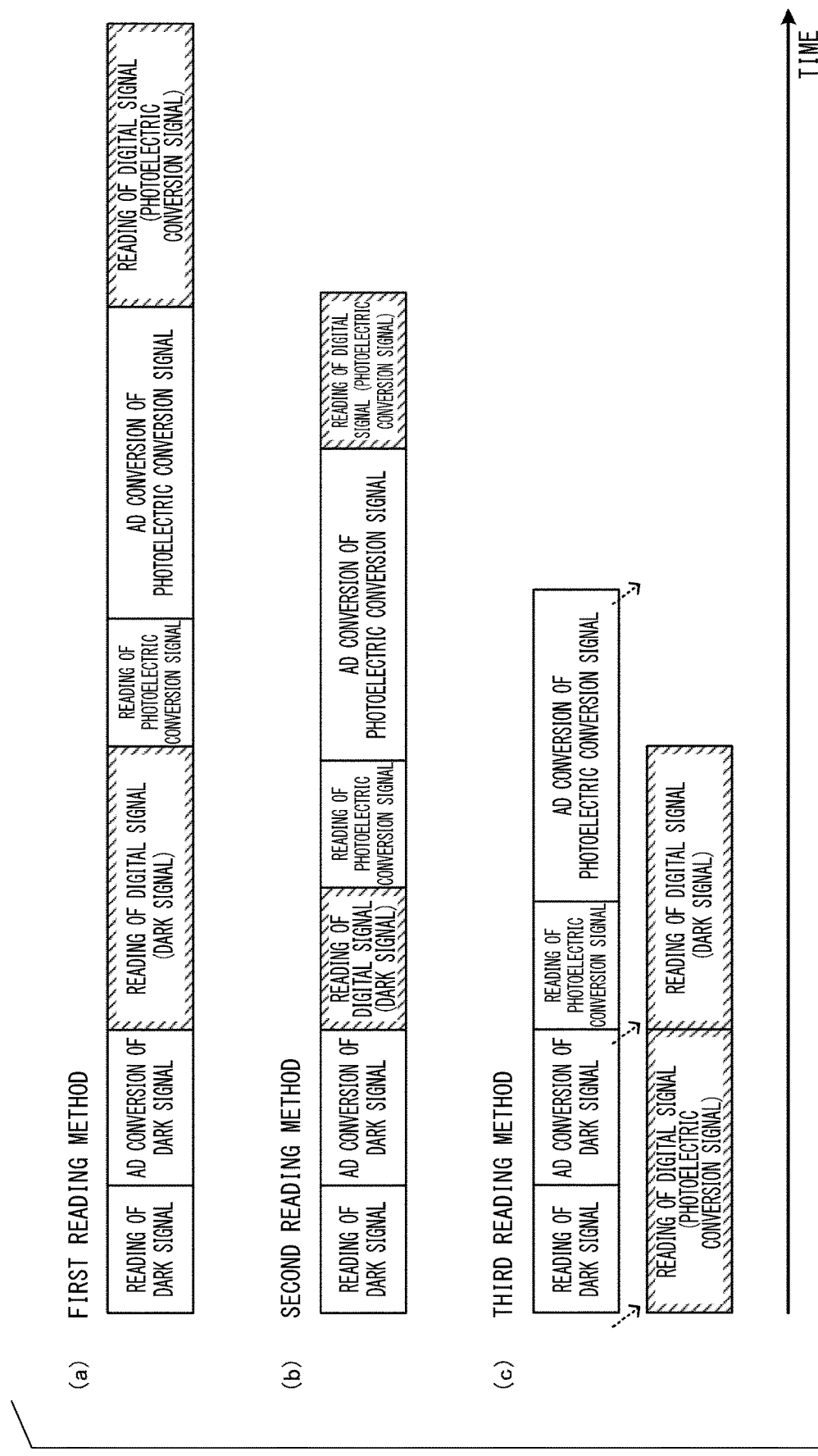

IMAGING ELEMENT AND IMAGING DEVICE WITH COMPARISON UNITS FOR COMPARING PHOTOELECTRIC SIGNALS WITH A REFERENCE SIGNAL

TECHNICAL FIELD

The present invention relates to an imaging element and an imaging device.

BACKGROUND ART

Conventionally, an imaging element having a storage unit that stores a digital value corresponding to the amount of light received by a pixel and a storage unit that temporarily stores a digital value for signal processing and horizontal transfer control is known (for example, refer to Patent Literature 1).

CITATION LIST

Patent Literature

[Patent Literature 1]
PCT International Publication No. WO 2017/18215

SUMMARY OF INVENTION

According to a first aspect of the present invention, an imaging element includes a first photoelectric conversion unit and a second photoelectric conversion unit that generates electric charges by photoelectric conversion, a first comparison unit that outputs a first signal based on a result of comparing a signal based on electric charges generated by the first photoelectric conversion unit and a reference signal, a first storage unit that stores a signal based on the first signal that is output by the first comparison unit, a second comparison unit that outputs a second signal based on a result of comparing a signal based on electric charges generated by the second photoelectric conversion unit and a reference signal, a second storage unit that stores a signal based on the second signal that is output from the second comparison unit, and a first connection unit that connects or disconnect the first comparison unit and the second storage unit.

According to a second aspect of the present invention, an imaging device includes the imaging element according to the first aspect, and a generation unit that generates image data on the basis of a signal output from the imaging element.

BRIEF DESCRIPTION OF DRAWINGS

FIG. 10 is a diagram which performs a comparison in reading processing of the imaging element according to the first embodiment.

DESCRIPTION OF EMBODIMENTS

First Embodiment

Figure 1:
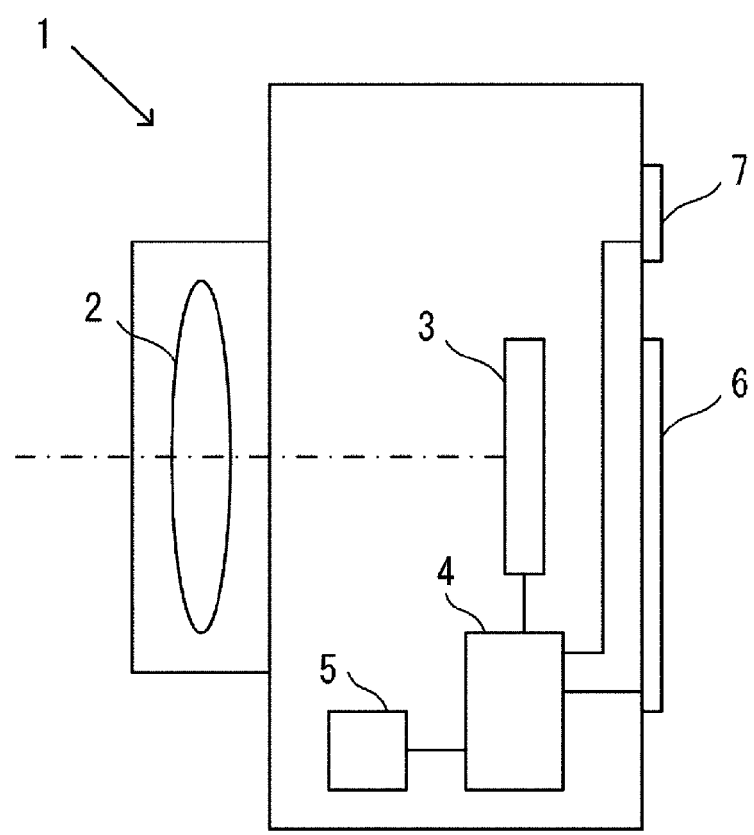
FIG. 1 is a diagram which shows a configuration example of an imaging device according to a first embodiment.

FIG. 1 is a diagram which shows a configuration example of a camera 1 that is an example of an imaging device according to a first embodiment. The camera 1 includes an image capturing optical system (an image forming optical system) 2, an imaging element 3, a control unit 4, a memory 5, a display unit 6, and an operation unit 7. The image capturing optical system 2 has a plurality of lenses including a focus adjusting lens (a focus lens) and an aperture diaphragm, and forms an image of a subject on the imaging element 3. The image capturing optical system 2 may also be detached from the camera 1.

The imaging element 3 is an imaging element such as a CMOS image sensor or a CCD imaging sensor. The imaging element 3 receives a luminous flux that has passed through the image capturing optical system 2 and captures a subject image formed by the image capturing optical system 2. In the imaging element 3, a plurality of pixels having a photoelectric conversion unit are arranged in a two-dimensional shape (a row direction and a column direction). The photoelectric conversion element is configured by a photodiode (PD). The imaging element 3 generates a signal by performing photoelectric conversion on the received light, and outputs the generated signal to the control unit 4.

The memory 5 is a recording medium such as a memory card. Image data, a control program, and the like are recorded in the memory 5. Writing data to the memory 5 and reading data from the memory 5 are controlled by the control unit 4. The display unit 6 displays an image based on the image data, information regarding photographing such as a shutter speed and a diaphragm value, a menu screen, and the like. The operation unit 7 includes various setting switches such as a release button, a power switch, and a switch for switching between various modes, and outputs a signal based on each operation to the control unit 4.

The control unit 4 is configured by a CPU, a processor such as an FPGA and an ASIC, and a memory such as a ROM or a RAM, and controls each part of the camera 1 based on the control program. The control unit 4 supplies a signal that controls the imaging element 3 to the imaging element 3 to control an operation of the imaging element 3. In addition, the control unit 4 performs various types of image processing on a signal output from the imaging element 3 to generate image data. The control unit 4 is also an image generation unit that generates image data, and generates still image data and moving image data on the basis of the signal output from the imaging element 3. The image processing includes image processing such as gradation conversion processing and color interpolation processing.

The control unit 4 performs processing of individually reading signals of all the pixels of the imaging element 3 and processing of mixing (adding) and reading signals of a plurality of pixels. The control unit 4 controls the imaging element 3 to select (set) a method of reading the pixel signals. For example, the control unit 4 performs processing of mixing and reading the signals of a plurality of pixels when a through image (a live-view image) of a subject is displayed on the display unit 6 and moving image photography is performed. Moreover, the control unit 4 performs processing of individually reading the signals of all the pixels when still image photography with high resolution is performed.

Figure 2:
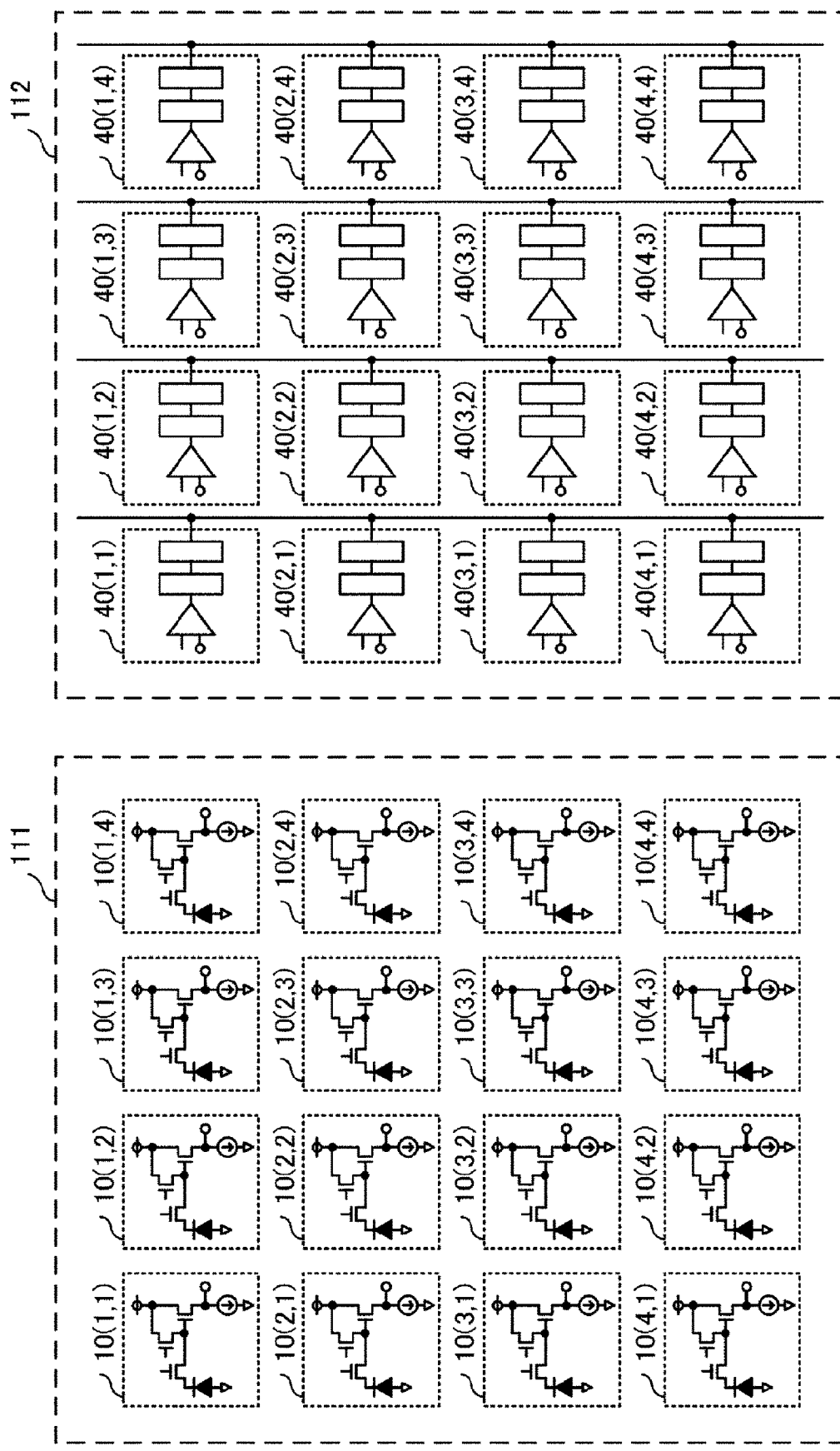
FIG. 2 is a block diagram which shows a configuration example of an imaging element according to the first embodiment.

FIG. 2 is a block diagram which shows a configuration example of the imaging element according to the first embodiment. The imaging element 3 is configured by laminating a first substrate 111 on which a plurality of pixels 10 are formed and a second substrate 112 on which a plurality of analog/digital conversion units (AD conversion units) 40 are formed. The first substrate 111 and the second substrate 112 are respectively configured by using a semiconductor substrate. Circuits provided on the first substrate 111 and circuits provided on the second substrate 112 are electrically connected by bumps, electrodes, and the like.

The first substrate 111 has a plurality of pixels 10 arranged in a two-dimensional manner. The pixel 10 outputs a photoelectric conversion signal and a dark signal, which will be described below, to the second substrate 112. In FIG. 2, 16 pixels 10 of 4 pixels in a row direction and 4 pixels in a column direction are shown with a pixel 10 at an upper left corner set as a pixel 10(1,1) in a first row and a first column, and a pixel 10 at a lower right corner set as a pixel 10(4,4) in a fourth row and a fourth column. The number and arrangement of pixels arranged in the imaging element are not limited to those in the shown example.

The second substrate 112 has a plurality of AD conversion units 40. In the present embodiment, the AD conversion unit 40 is provided for each pixel 10. In FIG. 2, 16 AD conversion units 40 from an AD conversion unit 40(1,1) to an AD conversion unit 40(4,4) are shown. As will be described below, the AD conversion unit 40 is configured to include a comparison unit and a storage unit, and converts an input photoelectric conversion signal and a dark signal into digital signals having the predetermined number of bits, respectively.

Figure 3:
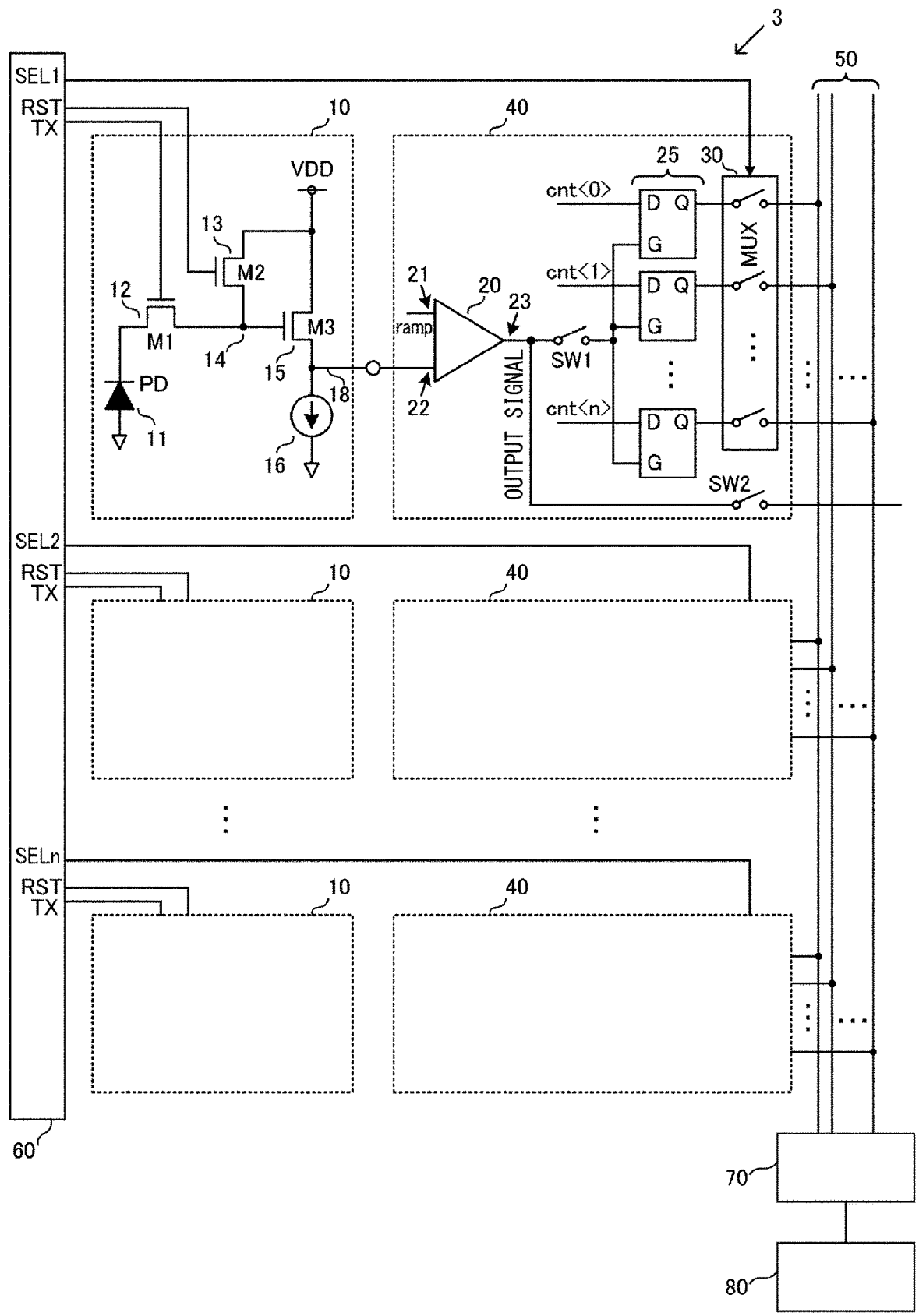
FIG. 3 is a circuit diagram which shows a configuration example of a part of the imaging element according to the first embodiment.

FIG. 3 is a circuit diagram which shows a configuration example of a part of the imaging element according to the first embodiment. The imaging element 3 includes a plurality of pixels 10, a plurality of AD conversion units 40, a reading control unit 60, a signal processing unit 70, and an input/output unit 80.

A pixel 10 has a photoelectric conversion unit 11, a transfer unit 12, a reset unit 13, a floating diffusion (FD) 14, an amplification unit 15, and a current source 16. The photoelectric conversion unit 11 is a photodiode PD, which converts incident light into electric charges and accumulates the photoelectrically converted electric charges. The transfer unit 12 is configured from a transistor M1 controlled by a signal TX, and transfers the electric charges photoelectrically converted by the photoelectric conversion unit 11 to the FD 14. The transistor M1 is a transfer transistor. The FD 14 accumulates (holds) the electric charges transferred to the FD 14. The current source 16 generates a current for reading a signal from the pixel 10, and supplies the generated current to the signal line 18 and the amplification unit 15.

The amplification unit 15 is configured from a transistor M3 whose gate (terminal) is connected to the FD 14, amplifies signals of electric charges accumulated in the FD 14, and outputs the signals to the signal line 18. The transistor M3 is an amplification transistor. The reset unit 13 is configured from a transistor M2 controlled by a signal RST, discharges the electric charges accumulated in the FD 14, and resets a voltage of the FD 14. The transistor M2 is a reset transistor.

The pixel 10 sequentially outputs a signal (a dark signal) when the voltage of the FD 14 is reset and a signal (a photoelectric conversion signal) corresponding to an electric charge transferred from the photoelectric conversion unit 11 to the FD 14 by the transfer unit 12 to the signal line 18. The dark signal is an analog signal indicating a reference level for the photoelectric conversion signal. In addition, the photoelectric conversion signal is an analog signal generated on the basis of an electric charge photoelectrically converted by the photoelectric conversion unit 11. The dark signal and the photoelectric conversion signal sequentially output from the pixel 10 are input to the AD conversion unit 40 via the signal line 18, a bump, and the like.

The AD conversion unit 40 has a comparison unit 20, a switch SW1, a storage unit 25, and a selection unit 30. The comparison unit 20 is configured to include a comparator circuit. A ramp signal ramp, which is a reference signal that changes with an elapse of time, is input to a first terminal 21 of the comparison unit 20 from a signal generation circuit (not shown). A signal (a photoelectric conversion signal or a dark signal) output from the pixel 10 to the signal line 18 is amplified and input to a second terminal 22 of the comparison unit 20 directly or by an amplifier circuit (not shown). The comparison unit 20 compares a signal input from the pixel 10 with the reference signal, and outputs an output signal that is a result of the comparison from the output terminal 23.

The comparison unit 20 is connected to the storage unit 25 via the switch SW1. The switch SW1 is configured by a transistor, and electrically connects or disconnects the comparison unit 20 and the storage unit 25. When the switch SW1 is in an ON state, the switch SW1 outputs an output signal of the comparison unit 20 to the storage unit 25.

The storage unit 25 is configured by a plurality of latch circuits corresponding to the number of bits of a digital signal to be stored. The output signal indicating the result of the comparison by the comparison unit 20 is input to one input terminal (a G terminal) of each latch circuit via the switch SW1. A clock signal indicating a count value is input from a counter circuit (not shown) to the other input terminal (a D terminal) of each latch circuit. In the example shown in FIG. 3, cnt<0> to cnt<n> indicating count values are input to the other input terminal (the D terminal) of each latch circuit, and the AD conversion unit 40 serves as an n-bit AD conversion circuit.

The storage unit 25 stores a count value according to an elapsed time from a start of comparison by the comparison unit 20 to an inversion of a result of the comparison as a digital signal on the basis of an output signal of the comparison unit 20 and a clock signal from a counter circuit. In other words, the storage unit 25 stores a count value according to a time until a magnitude relationship between a level of a signal output from the pixel 10 and a level of the reference signal changes (inverts) as a digital signal on the basis of a signal output from the comparison unit 20.

When a dark signal of a pixel 10 is input to the comparison unit 20, the comparison unit 20 compares the dark signal with the reference signal and outputs a result of the comparison to the storage unit 25. On the basis of the result of the comparison by the comparison unit 20 and a clock signal, the storage unit 25 stores the count value according to the elapsed time from the start of the comparison by the comparison unit 20 to the inversion of the result of the comparison as a digital signal based on the dark signal. When a photoelectric conversion signal of the pixel 10 is input to the comparison unit 20, the comparison unit 20 compares the photoelectric conversion signal with the reference signal, and outputs a result of the comparison to the storage unit 25. On the basis of the result of the comparison by the comparison unit 20 and the clock signal, the storage unit 25 stores the count value according to the elapsed time from the start of the comparison by the comparison unit 20 to the inversion of the result of the comparison as the digital signal based on the photoelectric conversion signal. In this manner, the AD conversion unit 40 converts the photoelectric conversion signal, which is an analog signal, into a digital signal having the predetermined number of bits, and converts the dark signal, which is an analog signal, into a digital signal having the predetermined number of bits.

The selection unit 30 is configured by a multiplexer controlled by a signal SEL, and a pixel signal (an n-bit digital signal in FIG. 3) converted into a digital signal is input from the storage unit 25. The selection unit 30 outputs the pixel signal input from the storage unit 25 to the signal line 50 (hereinafter, referred to as a data line). The data line 50 is configured by a plurality of signal lines corresponding to the number of bits of the digital signal output from the AD conversion unit 40. In the imaging element 3, data lines 50 (n signal lines in FIG. 3) are provided for each column of the plurality of AD conversion units 40 arranged in a longitudinal direction, that is, in a column direction (a vertical direction).

The signal processing unit 70 is configured to include an amplifier circuit, a decoder circuit, and the like. A pixel signal converted into a digital signal (a digital signal based on a dark signal or a digital signal based on a photoelectric conversion signal) is input to the signal processing unit 70 via the data line 50. The processing unit 70 performs signal processing such as correlation double sampling and code conversion processing on a signal input from the AD conversion unit 40 via the data line 50, and outputs the signal to the input/output unit 80. The input/output unit 80 has an input/output circuit corresponding to a high-speed interface such as those of SLVS and LVDS. The input/output unit 80 outputs (transmits) the signal input from the signal processing unit 70 to the control unit 4 of the camera 1 at a high speed.

The reading control unit 60 is commonly provided in the plurality of pixels 10 and the plurality of AD conversion units 40. The reading control unit 60 is configured by a plurality of circuits including a timing generator, which are arranged dividedly on the first substrate 111 and the second substrate 112. The reading control unit 60 may be arranged on either one of the first substrate 111 and the second substrate 112, or may be arranged on a substrate different from the first substrate 112 and the second substrate 112.

The reading control unit 60 supplies signals such as the signal TX and the signal RST that are controlled by the control unit 4 of the camera 1 and described above to each pixel 10 to control the operation of each pixel 10. The reading control unit 60 supplies a signal to a gate of each transistor of the pixel 10, and turns the transistor on (a connected state, a conducting state, or a short-circuited state) or turns it off (a disconnected state, a non-conducting state, an open state, or a cutoff state).

The reading control unit 60 supplies the signal SEL described above to the selection unit 30 of each AD conversion unit 40 and controls the selection unit 30 of each AD conversion unit 40. When the selection unit 30 is enabled (an on state) by the reading control unit 60, the pixel signal converted into a digital signal, which is input from the storage unit 25, is output to the signal processing unit 70 via the data line 50. The reading control unit 60 sequentially turns on the selection unit 30 of each AD conversion unit 40, and outputs a pixel signal stored in the storage unit 25 connected to the selection unit 30 that is turned on to the data line 50. It can be said that the reading control unit 60 sequentially selects a plurality of AD conversion units 40 and reads a pixel signal converted into a digital signal from the selected AD conversion unit 40. An n-bit pixel signal converted into a digital signal is input to the signal processing unit 70 for each data line 50.

Figure 4:
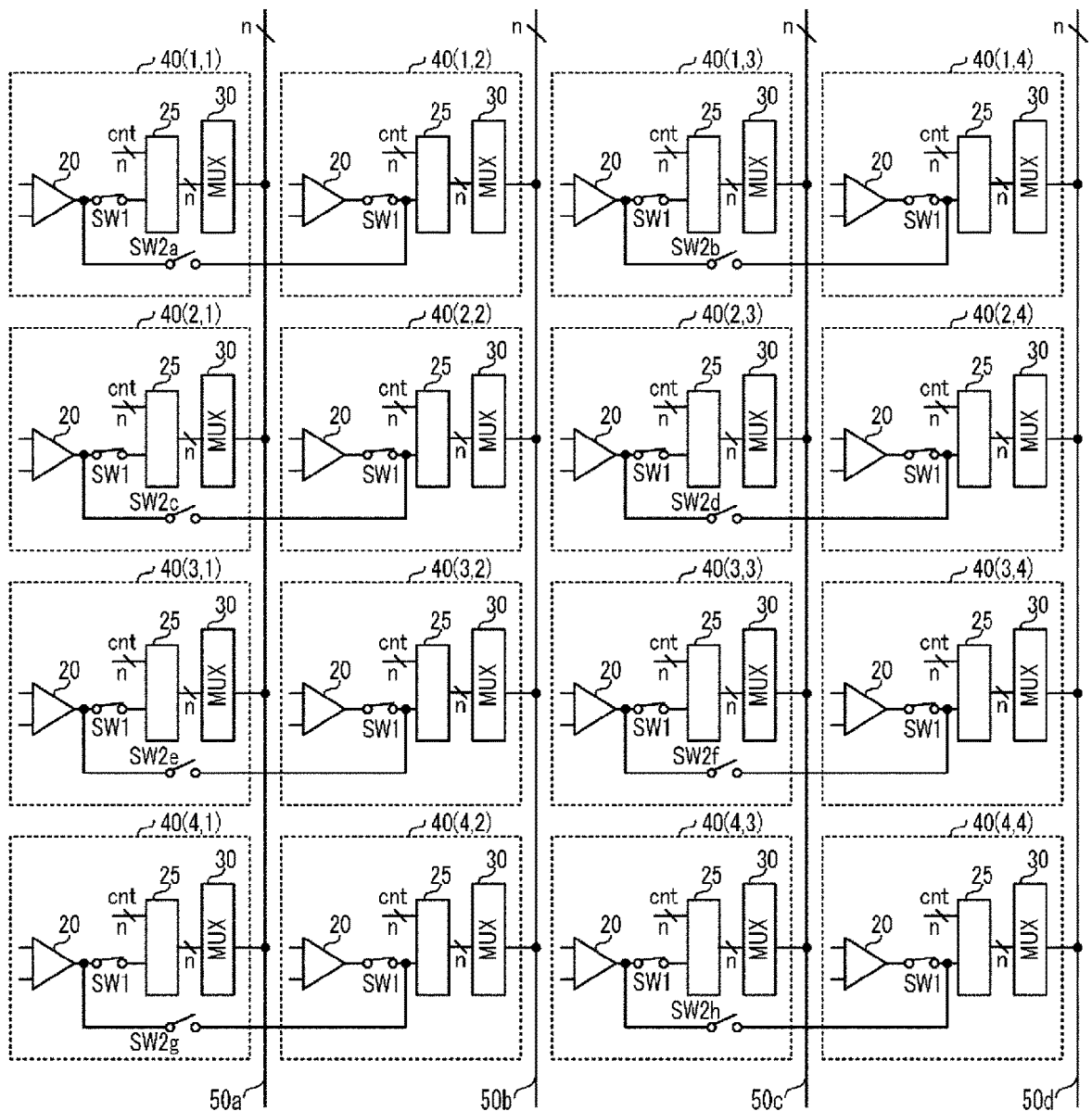
FIG. 4 is a diagram which describes reading processing of the imaging element according to the first embodiment.

FIG. 4 is a diagram which describes reading processing of the imaging element according to the first embodiment. The imaging element 3 is provided with a switch SW2 (a switch SW2a to a switch SW2h in FIG. 4) that connects or disconnects the comparison unit 20 of the AD conversion unit 40 and the storage unit 25 of an AD conversion unit 40 different from the AD conversion unit 40. In the present embodiment, the switch SW2 connects an output terminal 23 of the comparison unit 20 of one AD conversion unit 40 and an input terminal (a G terminal) of the storage unit 25 of the other AD conversion unit 40 among two AD conversion units 40 adjacent to each other in the row direction.

In the example shown in FIG. 4, the switch SW2 is provided between the comparison unit 20 of each of AD conversion units 40 in an odd-numbered column and the storage unit 25 of each of AD conversion units 40 in an even-numbered column. The switch SW2 is configured by a transistor. For example, a switch SW2a is a connection unit 2a, and connects the comparison unit 20 of an AD conversion unit 40(1,1) and the storage unit 25 of an AD conversion unit 40(1,2) among AD conversion units 40 in a first row. A switch SW2e is a connection unit 2e, and connects the comparison unit 20 of an AD conversion unit 40(3,1) and the storage unit 25 of an AD conversion unit 40(3,2) among AD conversion units 40 in a third row. The reading control unit 60 (refer to FIG. 3) supplies signals to each of the switches SW2a to SW2h to control on and off of each switch.

The reading control unit 60 performs processing of individually reading a signal of each pixel of the imaging element 3 (individual reading processing) and processing of adding and reading signals of a plurality of pixels (addition reading processing). In the individual reading processing, the reading control unit 60 sequentially selects an AD conversion unit 40 of the imaging element 3 from a first row to a fourth row in units of rows, and reads a pixel signal from the selected AD conversion unit 40 in FIG. 4.

Figure 5:
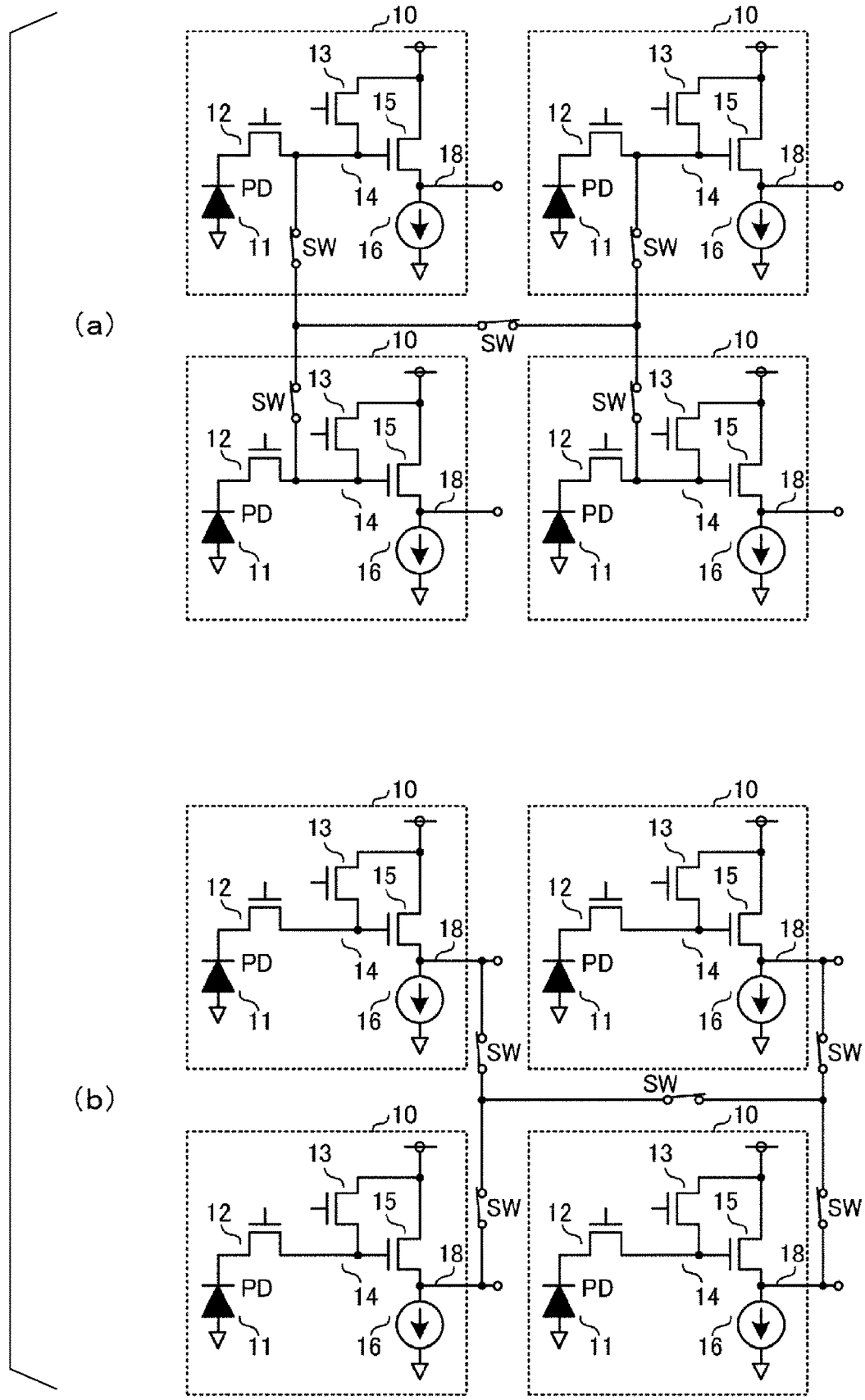
FIG. 5 is a diagram which describes an example of a method of adding pixel signals in the imaging element according to the first embodiment.

In the addition reading processing, the reading control unit 60 controls a plurality of switches SW as shown in FIG. 5(a) and connects the FD 14 of each of the plurality of pixels 10 to each other to add the signals of the plurality of pixels. The reading control unit 60 may control a plurality of switch SWs as shown in FIG. 5(b), and connect the amplification unit 15 of a plurality of pixels 10 to the same signal line 18 to add the signals of the plurality of pixels. The reading control unit 60 performs processing of selecting some AD conversion units 40 to which a signal generated by adding the signals of a plurality of pixels is input (hereinafter, referred to as first AD conversion units) for each row or plural rows among the plurality of AD conversion units 40 of the imaging element 3 and reading the signals of pixels.

In the present embodiment, the addition reading processing has a first reading method, a second reading method, and a third reading method. The first reading method is a method in which the first AD conversion unit 40 is sequentially selected for each row, and a pixel signal converted into a digital signal is read. The first AD conversion unit 40 is an AD conversion unit 40 that is selected by thinning out AD conversion units 40 of a specific row or column among all the AD conversion units 40. In the first AD conversion unit 40, an added pixel signal is input, and the added pixel signal is converted into a digital signal.

The second reading method is a method in which the first AD conversion unit 40 is sequentially selected for each of a plurality of rows, and a pixel signal that is converted into a digital signal is read.

The third reading method is a method in which AD conversion of a pixel signal (for example, a photoelectric conversion signal) and reading of a pixel signal converted to a digital signal (for example, a digital signal based on a dark signal) are performed at the same time (in parallel). The control unit 4 of the camera 1 controls the reading control unit 60 to switch a reading method of a pixel signal.

(Individual Reading Processing)

In the individual reading processing, the reading control unit 60 turns on the switch SW1 of the plurality of AD conversion units 40 of the imaging element 3, and causes each AD conversion unit 40 to perform AD conversion. The reading control unit 60 sequentially selects the plurality of these AD conversion units 40 in units of rows, and causes a pixel signal converted into a digital signal to be output from the selected AD conversion units 40 to the data line 50.

(First Reading Method of Addition Reading Processing)

In the first reading method, the reading control unit 60 turns on the switches SW1 of the plurality of first AD conversion units 40, and causes each of the plurality of first AD conversion units 40 to perform AD conversion. The reading control unit 60 sequentially selects the plurality of these first AD conversion units 40 in units of rows, and causes a pixel signal converted into a digital signal to be output from the selected first AD conversion units 40 to the data line 50. As described above, in the case of the first reading method, the reading control unit 60 uses only the first AD conversion unit 40 among all the AD conversion units 40. Other AD conversion units 40 (hereinafter, referred to as second AD conversion units) different from the first AD conversion units 40 and the data line 50 to which these second AD conversion units 40 are connected are not used in the case of the first reading method, and are brought into a pause state.

(Second Reading Method of Addition Reading Processing)

In the second reading method, the reading control unit 60 controls the switch SW1 and the switch SW2 to use the storage unit 25 and the selection unit 30 of the second AD conversion unit 40, and the data line 50 connected to the second AD conversion unit 40 in addition to the first AD conversion unit 40. In the second reading method, by using the data lines 50 provided for different columns, it is possible to simultaneously read a pixel signal converted into a digital signal from the AD conversion unit 40 of a plurality of rows. The imaging element 3 can read a pixel signal in a shorter time than in a case where the first AD conversion unit 40 is selected in units of rows and a pixel signal is sequentially read by the data line 50.

(Third Reading Method of Addition Reading Processing)

Also in the case of the third reading method, the reading control unit 60 uses the storage unit 25 and selection unit 30 of the second AD conversion unit 40 and the data line 50 connected to the second AD conversion unit 40 in addition to the first AD conversion unit 40. The reading control unit 60 controls the switch SW1 and the switch SW2 and control whether an output signal of the comparison unit 20 of the first AD conversion unit 40 is output to the storage unit 25 of the first AD conversion unit 40 or the storage unit 25 of the second AD conversion unit 40. It can be said that the reading control unit 60 switches the storage unit 25 which is an output destination of a result of the comparison by the comparison unit 20 of the first AD conversion unit 40.

In the third reading method, the reading control unit 60 switches a connection destination of the comparison unit 20 of the first AD conversion unit 40 to the storage unit 25 of the first AD conversion unit 40 or the storage unit 25 of the second AD conversion unit 40 when a dark signal is input to the comparison unit 20 of the first AD conversion unit 40 and when a photoelectric conversion signal is input to the comparison unit 20 of the first AD conversion unit 40. For example, when a dark signal is input to the comparison unit 20 of the first AD conversion unit 40, the reading control unit 60 connects the comparison unit 20 of the first AD conversion unit 40 and the storage unit 25 of the first AD conversion unit 40. The comparison unit 20 of the first AD conversion unit 40 outputs an output signal indicating a result of comparing the dark signal and the reference signal to the storage unit 25 of the first AD conversion unit 40 via the switch SW1. The storage unit 25 of the first AD conversion unit 40 stores a digital signal based on the dark signal on the basis of the output signal of the comparison unit 20.

After the AD conversion of the dark signal is completed, the reading control unit 60 starts reading the digital signal based on the dark signal from the storage unit 25 of the first AD conversion unit 40 to the data line 50. Moreover, the reading control unit 60 connects the comparison unit 20 of the first AD conversion unit 40 and the storage unit 25 of the second AD conversion unit 40. At this time, when a photoelectric conversion signal is input to the comparison unit 20 of the first AD conversion unit 40, the comparison unit 20 of the first AD conversion unit 40 outputs an output signal indicating a result of comparing the photoelectric conversion signal and the reference signal to the storage unit 25 of the second AD conversion unit 40 via the switch SW2. The storage unit 25 of the second AD conversion unit 40 stores a digital signal based on the photoelectric conversion signal on the basis of the output signal of the comparison unit 20 of the first AD conversion unit 40.

In this manner, in the third reading method, AD conversion is performed using different storage units 25 depending on whether AD conversion of a dark signal is performed or AD conversion of a photoelectric conversion signal is performed. As a result, reading of a digital signal based on a dark signal and AD conversion of a photoelectric conversion signal can be performed in parallel. Similarly, reading of a digital signal based on a photoelectric conversion signal and AD conversion of a dark signal can be performed in parallel. For this reason, the imaging element 3 does not need to wait for a completion of the processing of reading a pixel signal to the data line 50 to start next AD conversion processing, and can read a pixel signal in a short time. In the following description, the individual reading processing and the first to third reading methods of the addition reading processing will be further described with reference to FIGS. 4 to 10.

(Individual Reading Processing)

When the individual reading processing is instructed by the control unit 4, the reading control unit 60 turns on each switch SW1 of the AD conversion unit 40(1,1) to the AD conversion unit 40(4,4) as shown in FIG. 4, and turns off the switches SW2a to SW2h.

The reading control unit 60 turns on each of the reset units 13 of the pixel 10(1,1) to the pixel 10(4,4). As a result, a voltage of each FD 14 is reset at each pixel 10. Each dark signal of the pixel 10(1,1) to the pixel 10(4,4) is output to each of the AD conversion unit 40(1,1) to the AD conversion unit 40(4,4) via a signal line 18 connected to each pixel 10. The AD conversion unit 40(1,1) to the AD conversion unit 40(4,4) convert the input dark signal into a digital signal. The storage units 25 of each of the AD conversion unit 40(1,1) to the AD conversion unit 40(4,4) store a digital signal based on a dark signal of the pixel 10(1,1) to pixel 10(4,4), respectively.

The reading control unit 60 turns on each of the selection units 30 of the AD conversion unit 40(1,1) to an AD conversion unit 40(1,4), which are AD conversion units 40 in a first row, and turns off each of selection units 30 of AD conversion units 40 in the rows other than the first row. As a result, digital signals based on dark signals of the AD conversion unit 40(1,1) to the AD conversion unit 40(1,4) are output to each of the data lines 50a to 50d via each of the selection unit 30 of the AD conversion units 40.

After reading the digital signal based on a dark signal from each of the AD conversion units 40 in the first row, the reading control unit 60 turns on each of the selection units 30 of an AD conversion unit 40(2,1) to an AD conversion unit 40(2,4), which are AD conversion units 40 in a second row, and turns off each of the selection units 30 of AD conversion units 40 in the rows other than the second row. As a result, digital signals based on dark signals of the AD conversion unit 40(2,1) to the AD conversion unit 40(2,4) are output to each of the data lines 50a to 50d via each of the selection units 30 of the AD conversion units 40. In addition, similarly, the reading control unit 60 sequentially selects AD conversion units 40 of a third row and subsequent rows for each row in an order of the third row, a fourth row, and a fifth row, and reads a digital signal based on a dark signal from each of the selected AD conversion units 40.

The reading control unit 60 turns on each of the transfer units 12 of the pixel 10(1,1) to the pixel 10(4,4). As a result, at each pixel 10, electric charges photoelectrically converted by each PD 11 are transferred to the FD 14. Photoelectric conversion signals of each of the pixel 10(1,1) to the pixel 10(4,4) are output to the AD conversion unit 40(1,1) to the AD conversion unit 40(4,4) via the signal line 18 connected to each pixel 10, respectively. The AD conversion unit 40(1,1) to the AD conversion unit 40(4,4) convert the input photoelectric conversion signals into digital signals. The storage units 25 of each of the AD conversion unit 40(1,1) to the AD conversion unit 40(4,4) store digital signals based on photoelectric conversion signals of the pixel 10(1,1) to the pixel 10(4,4), respectively.

The reading control unit 60 selects AD conversion units for each row in the order of the first row, the second row, the third row, the fourth row, and the fifth row, and read a digital signal based on a photoelectric conversion signal from each selected AD conversion unit 40 in the same manner as when it reads a digital signal based on a dark signal from each AD conversion unit 40.

In this manner, in the individual reading processing, the reading control unit 60 individually reads the signals of pixels of the imaging element 3. The digital signal based on a dark signal and the digital signal based on a photoelectric conversion signal that are sequentially output to the data lines 50a to 50d are subjected to signal processing such as correlation double sampling performed by the signal processing unit 70 (refer to FIG. 3), and then are output to the control unit 4 via the input/output unit 80.

(First to Third Reading Methods of Addition Reading Processing)

In the first to third reading methods of the addition reading processing, the reading control unit 60 adds the signals of a plurality of pixels for each of the plurality of pixels. In the following description, an example will be described in which, for every four pixels of 2 pixels×2 pixels, the signals of these four pixels are added. A signal obtained by adding a signal of the pixel 10(1,1), a signal of the pixel 10(1,2), a signal of the pixel 10(2,1), a signal of the pixel 10(2,2) is input to the AD conversion unit 40(1,1). A signal obtained by adding signals of each of a pixel 10(1,3), a pixel 10(1,4), a pixel 10(2,3), and a pixel 10(2,4) is input to the AD conversion unit 40(1,3). In addition, a signal obtained by adding signals of each of a pixel 10(3,1), a pixel 10(3,2), a pixel 10(4,1), and a pixel 10(4,2) is input to the AD conversion unit 40(3,1), and a signal obtained by adding signals of each of a pixel 10(3,3), a pixel 10(3,4), a pixel 10(4,3), and a pixel 10(4,4) is input to the AD conversion unit 40(3,3).

Figure 6:
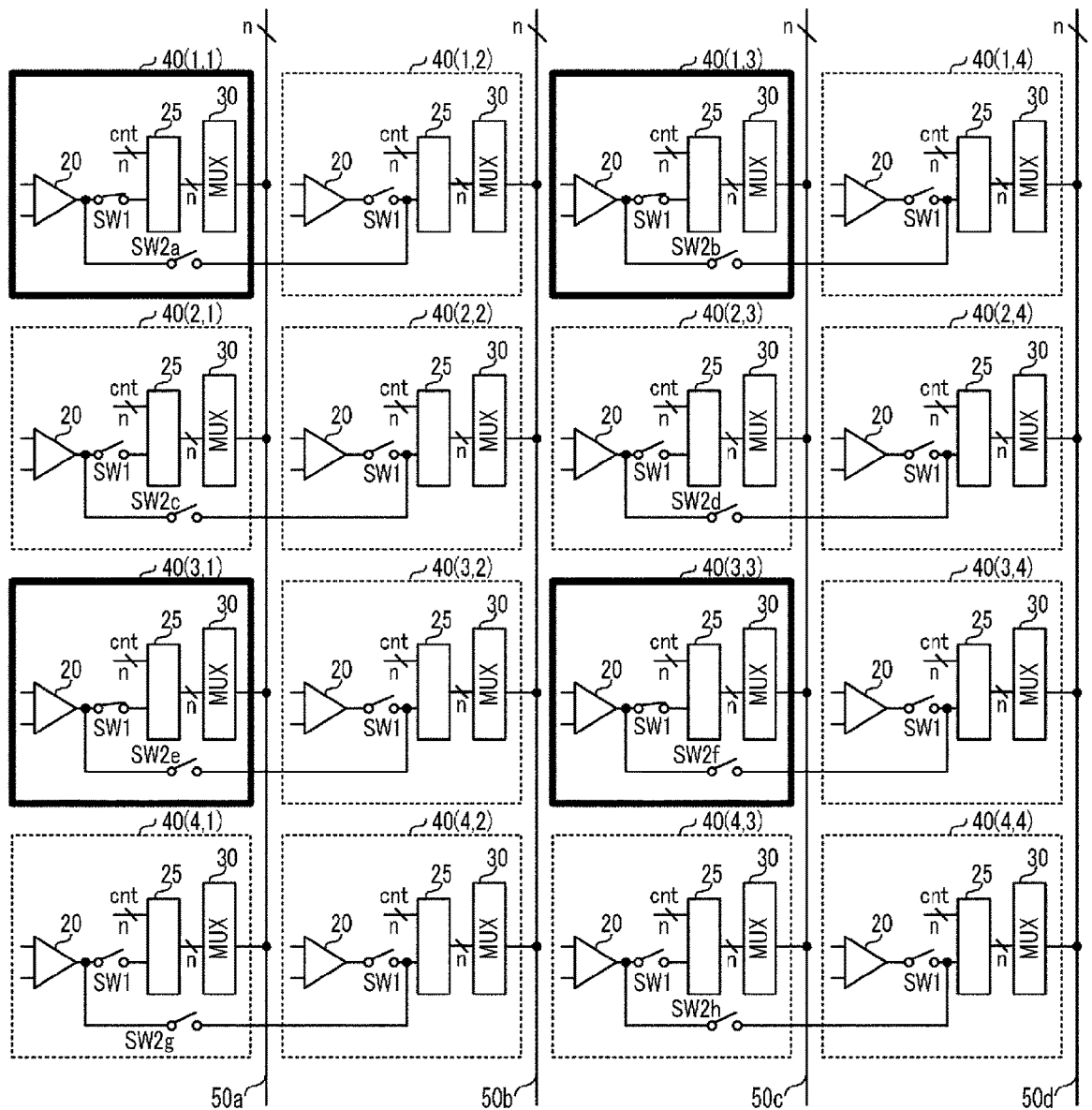
FIG. 6 is a diagram which describes another reading processing of the imaging element according to the first embodiment.
Figure 7:
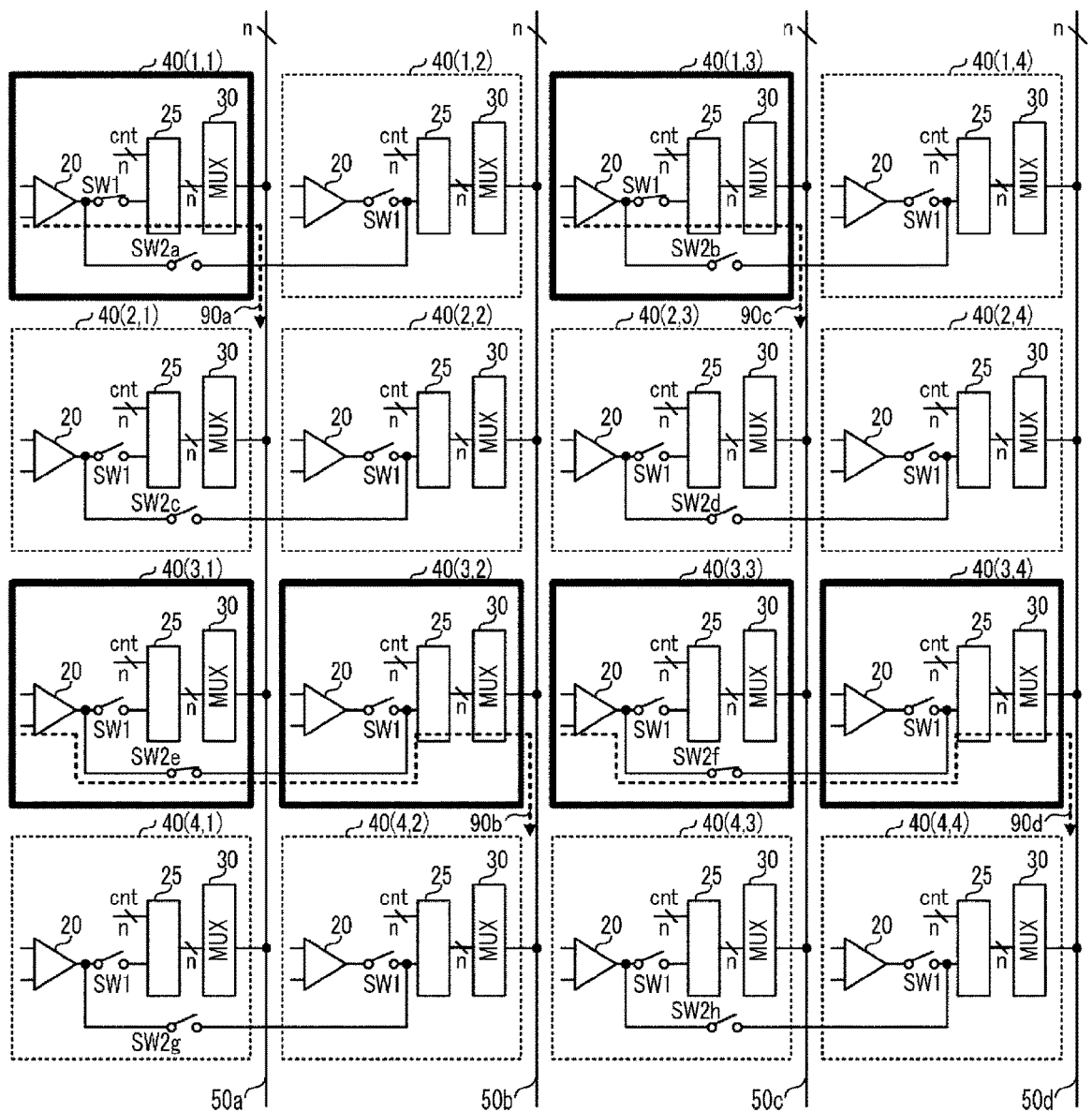
FIG. 7 is a diagram which describes another reading processing of the imaging element according to the first embodiment.
Figure 8:
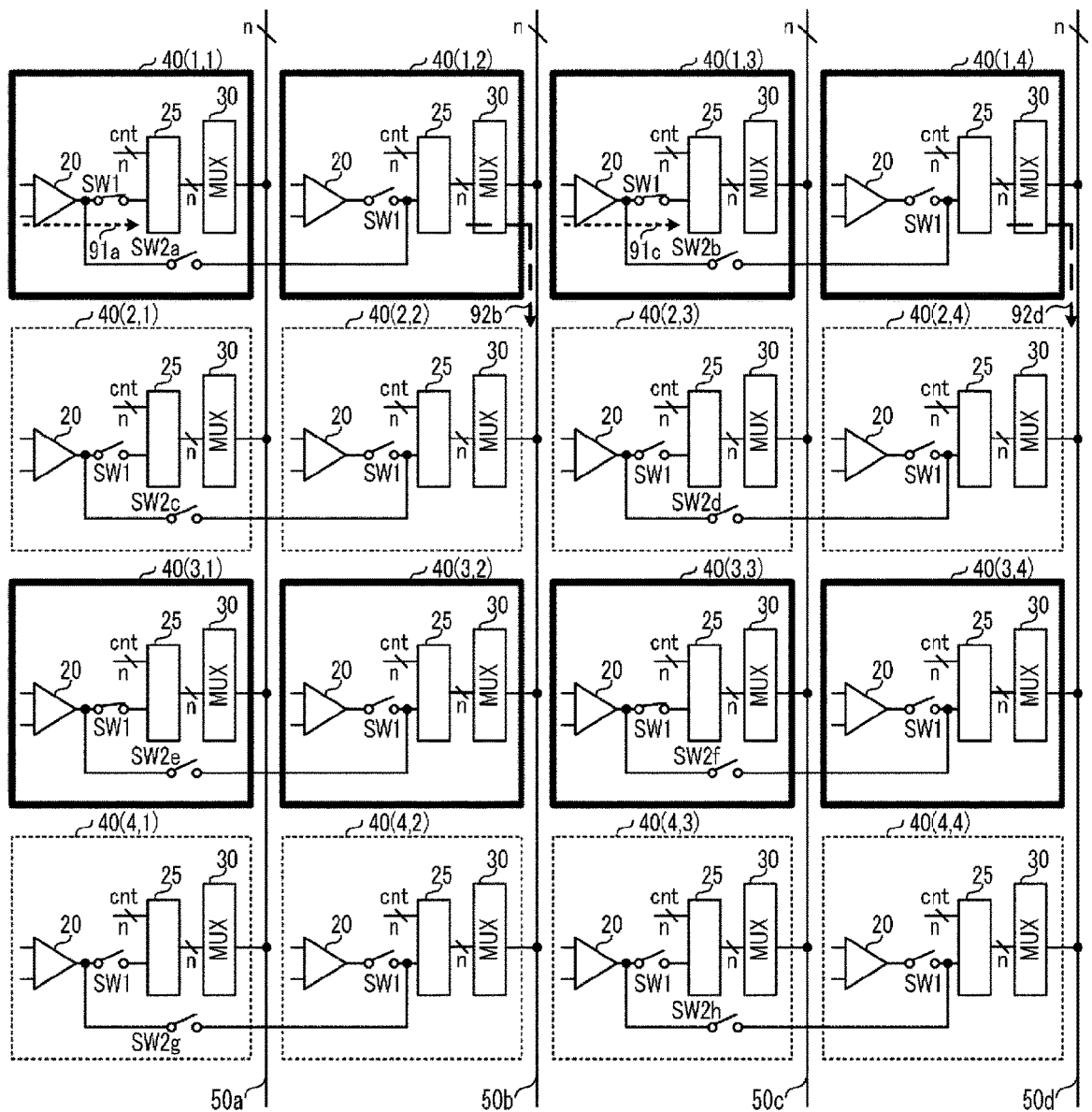
FIG. 8 is a diagram which describes another reading processing of the imaging element according to the first embodiment.
Figure 9:
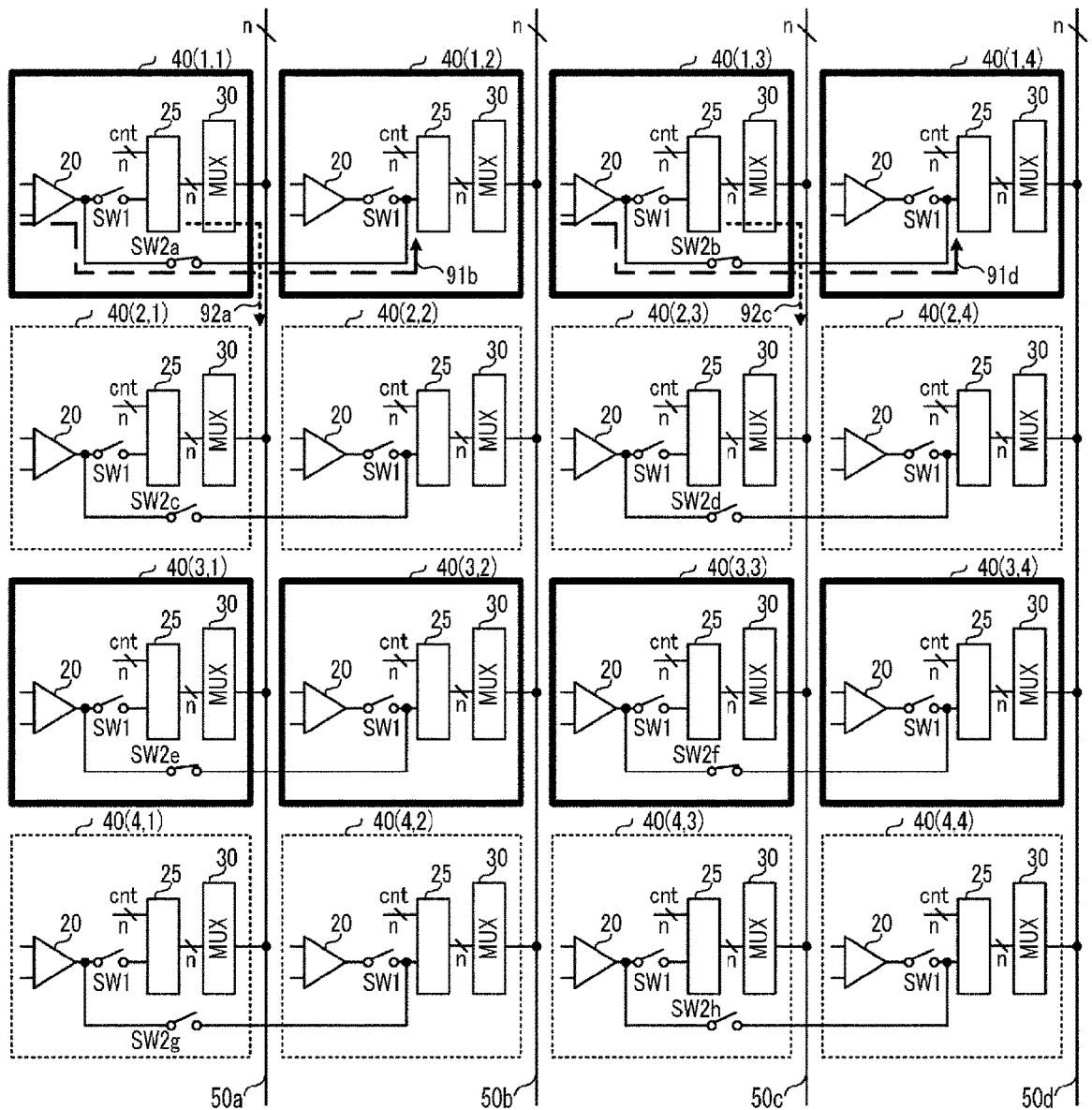
FIG. 9 is a diagram which describes another reading processing of the imaging element according to the first embodiment.

The AD conversion unit 40(1,1), the AD conversion unit 40(1,3), the AD conversion unit 40(3,1), and the AD conversion unit 40(3,3) function as the first AD conversion unit described above. In FIG. 6, these AD conversion units 40 surrounded by thick lines are examples of AD conversion units used in the case of the first reading method. The AD conversion units 40 surrounded by thick lines in FIG. 7 are examples of AD conversion units used in the case of the second reading method, and the AD conversion units 40 surrounded by thick lines in FIGS. 8 and 9 are examples of AD conversion units used in the case of the third reading method.

(First Reading Method of Addition Reading Processing)

When the first reading method is instructed by the control unit 4, the reading control unit 60 turns on the switch SW1 of each of the AD conversion unit 40(1,1), the AD conversion unit 40(1,3), the AD conversion unit 40(3,1), and the AD conversion unit 40(3,3), as shown in FIG. 6, and turns off the switches SW2a to SW2h. When an added dark signal is input, the AD conversion unit 40(1,1), the AD conversion unit 40(1,3), the AD conversion unit 40(3,1), and the AD conversion unit 40(3,3) convert the dark signal into a digital signal. The storage units 25 of each of the AD conversion unit 40(1,1), the AD conversion unit 40(1,3), the AD conversion unit 40(3,1), and the AD conversion unit 40(3,3) store a digital signal based on the added dark signal, respectively.

The reading control unit 60 turns on the selection units 30 of the AD conversion unit 40(1,1) and the AD conversion unit 40(1,3) in the first row, respectively, and turns off the selection units 30 of other AD conversion units 40 different from the AD conversion unit 40(1,1) and the AD conversion unit 40(1,3). As a result, a digital signal based on an added dark signal of the AD conversion unit 40(1,1) is output to the data line 50a via the selection unit 30 of the AD conversion unit 40(1,1). Moreover, a digital signal based on an added dark signal of the AD conversion unit 40(1,3) is output to the data line 50c via the selection unit 30 of the AD conversion unit 40(1,3).

After the digital signals based on the dark signals from the AD conversion unit 40(1,1) and the AD conversion unit 40(1,3) in the first row are read, the reading control unit 60 turns on the selection units 30 of the AD conversion unit 40(3,1) and the AD conversion unit 40(3,3) in the third row, respectively. Moreover, the reading control unit 60 turns off the selection units 30 of other AD conversion units 40 different from the AD conversion unit 40(3,1) and the AD conversion unit 40(3,3), respectively. As a result, a digital signal based on an added dark signal of the AD conversion unit 40(3,1) is output to the data line 50a via the selection unit 30 of the AD conversion unit 40(3,1). Furthermore, a digital signal based on an added dark signal of the AD conversion unit 40(3,3) is output to the data line 50c via the selection unit 30 of the AD conversion unit 40(3,3). After that, in the same manner, the reading control unit 60 sequentially selects AD conversion units 40 for each row, and reads a digital signal based on a dark signal from each of the selected AD conversion units 40.

When an added photoelectric conversion signal is input, the AD conversion unit 40(1,1), the AD conversion unit 40(1,3), the AD conversion unit 40(3,1), and the AD conversion unit 40(3,3) convert the photoelectric conversion signal to a digital signal. The storage units 25 of each of the AD conversion unit 40(1,1), the AD conversion unit 40(1,3), the AD conversion unit 40(3,1), and the AD conversion unit 40(3,3) store a digital signal based on an added photoelectric conversion signal, respectively. The reading control unit 60 sequentially selects AD conversion units 40 for each row and reads a digital signal based on a photoelectric conversion signal from each of the selected AD conversion units 40 in the same manner as when a digital signal based on a dark signal is read from each AD conversion unit 40.

In this manner, in the first reading method, the reading control unit 60 sequentially selects some AD conversion units 40 among all the AD conversion units 40 of the imaging element 3 for each row, and reads a pixel signal converted into a digital signal. The digital signal based on a dark signal and the digital signal based on a photoelectric conversion signal sequentially output to the data lines 50a and 50c are output to the control unit 4 by the input/output unit 80 after being subjected to signal processing by the signal processing unit 70.

(Second Reading Method of Addition Reading Processing)

When the second reading method is instructed by the control unit 4, the reading control unit 60 turns on each switch SW1 of the AD conversion unit 40(1,1) and the AD conversion unit 40(1,3) as shown in FIG. 7. In addition, the reading control unit 60 turns on the switch SW2e and the switch SW2f. When the switch SW2e is turned on, the comparison unit 20 of the AD conversion unit 40(3,1) and the storage unit 25 of the AD conversion unit 40(3,2) are electrically connected. Furthermore, when the switch SW2f is turned on, the comparison unit 20 of the AD conversion unit 40(3,3) and the storage unit 25 of the AD conversion unit 40(3,4) are electrically connected. The AD conversion unit 40(3,2) and the AD conversion unit 40(3,4) function as the second AD conversion unit described above.

When an added dark signal is input, the AD conversion unit 40(1,1) and the AD conversion unit 40(1,3) convert the dark signal into a digital signal. The storage units 25 of each of the AD conversion unit 40(1,1) and the AD conversion unit 40(1,3) store a digital signal based on an added dark signal, respectively.

When an added dark signal is input, the comparison unit 20 of the AD conversion unit 40(3,1) outputs an output signal indicating a result of comparing the added dark signal and the reference signal to the storage unit 25 of the AD conversion unit 40(3,2) via the switch SW2e. The storage unit 25 of the AD conversion unit 40(3,2) stores a digital signal based on the added dark signal on the basis of the output signal of the comparison unit 20 of the AD conversion unit 40(3,1). In this manner, the added dark signal input to the comparison unit 20 of the AD conversion unit 40(3,1) is converted into a digital signal by the comparison unit 20 of the AD conversion unit 40(3,1) and the storage unit 25 of the AD conversion unit 40(3,2).

When an added dark signal is input, the comparison unit 20 of the AD conversion unit 40(3,3) outputs an output signal indicating a result of comparing the dark signal and the reference signal to the storage unit 25 of the AD conversion unit 40(3,4) via the switch SW2f. The storage unit 25 of the AD conversion unit 40(3,4) stores a digital signal based on the added dark signal on the basis of the output signal of the comparison unit 20 of the AD conversion unit 40(3,3). In this manner, the added dark signal input to the comparison unit 20 of the AD conversion unit 40(3,3) is converted into a digital signal by the comparison unit 20 of the AD conversion unit 40(3,3) and the storage unit 25 of the AD conversion unit 40(3,4).

The reading control unit 60 turns on the selection units 30 of each of the AD conversion unit 40(1,1) and the AD conversion unit 40(1,3) in the first row, and the selection units 30 of each of the AD conversion unit 40(3,2) and the AD conversion unit 40(3,4) in the third row, respectively. Moreover, the reading control unit 60 turns off the selection units 30 of other AD conversion units 40 different from the AD conversion unit 40(1,1), the AD conversion unit 40(1,3), the AD conversion unit 40(3,2), and the AD conversion unit 40(3,4).

The added dark signal input to the comparison unit 20 of the AD conversion unit 40(1,1) is converted into a digital signal by the AD conversion unit 40(1,1) as schematically shown by an arrow 90a, and then is output to the data line 50a via the selection unit 30 of the AD conversion unit 40(1,1). Moreover, the added dark signal input to the comparison unit 20 of the AD conversion unit 40(3,1) is, as schematically shown by an arrow 90b, converted into a digital signal by the comparison unit 20 of the AD conversion unit 40(3,1) and the storage unit 25 of the AD conversion unit 40(3,2), and then is output to the data line 50b via the selection unit 30 of the AD conversion unit 40(3,2).

The added dark signal input to the comparison unit 20 of the AD conversion unit 40(1,3) is converted into a digital signal by the AD conversion unit 40(1,3) as schematically shown by an arrow 90c, and then is output to the data line 50c via the selection unit 30 of the AD conversion unit 40(1,3). Moreover, the added dark signal input to the comparison unit 20 of the AD conversion unit 40(3,3) is converted into a digital signal by the comparison unit 20 of the AD conversion unit 40(3,3) and the storage unit 25 of the AD conversion unit 40(3,4) as schematically shown by an arrow 90d, and then is output to the data line 50d via the selection unit 30 of the AD conversion unit 40(3,4). After that, in the same manner, the reading control unit 60 sequentially selects AD conversion units 40 for each two rows, and reads a digital signal based on a dark signal from each of the selected AD conversion units 40.

When an added photoelectric conversion signal is input, the AD conversion unit 40(1,1) and the AD conversion unit 40(1,3) convert the photoelectric conversion signal into a digital signal. The storage units 25 of each of the AD conversion unit 40(1,1) and the AD conversion unit 40(1,3) store a digital signal based on an added photoelectric conversion signal, respectively. The added photoelectric conversion signal input to the comparison unit 20 of the AD conversion unit 40(3,1) is converted into a digital signal by the comparison unit 20 of the AD conversion unit 40(3,1) and the storage unit 25 of the AD conversion unit 40(3,2), and stored in the storage unit 25 of the AD conversion unit 40(3,2). In addition, the added photoelectric conversion signal input to the comparison unit 20 of the AD conversion unit 40(3,3) is converted into a digital signal by the comparison unit 20 of the AD conversion unit 40(3,3) and the storage unit 25 of the AD conversion unit 40(3,4), and stored in the storage unit 25 of the AD conversion unit 40(3,4).

The reading control unit 60 sequentially selects AD conversion units 40 for each two rows, and reads a digital signal based on a photoelectric conversion signal from each of the selected AD conversion units 40 in the same manner as when the digital signal based on a dark signal from each AD conversion unit 40 is read.

In this manner, in the second reading method, the reading control unit 60 controls the switch SW1 and the switch SW2 such that an AD conversion unit 40 that is in the pause state in the case of the first reading method and the data lines 50*b* and 50*d* connected to the AD conversion unit 40 are also used. For this reason, the reading control unit 60 can sequentially select AD conversion units 40 for each two rows and read a pixel signal converted into a digital signal. As a result, a pixel signal can be read in a shorter time than when AD conversion units 40 are sequentially selected for each row to read a pixel signal. The digital signal based on a dark signal and the digital signal based on a photoelectric conversion signal sequentially output to the data lines 50*a* to 50*d* are output to the control unit 4 by the input/output unit 80 after being subjected to signal processing by the signal processing unit 70.

(Third Reading Method of Addition Reading Processing)

FIGS. 8 and 9 are diagrams which describe the reading processing of an imaging element when the third reading method is instructed by the control unit 4. FIG. 8 shows a connection state of the switch SW1 and the switch SW2 when an added dark signal is input to the comparison unit 20 of the AD conversion unit 40. FIG. 9 shows the connection state of the switch SW1 and the switch SW2 when an added photoelectric conversion signal is input to the comparison unit 20 of the AD conversion unit 40. In the examples shown in FIGS. 8 and 9, the AD conversion unit 40(1,2), the AD conversion unit 40(1,4), the AD conversion unit 40(3,2), and the AD conversion unit 40(3,4) function as the second AD conversion unit described above.

When an added dark signal is input to the comparison unit 20 of the AD conversion unit 40, the reading control unit 60 turns on each switch SW1 of the AD conversion unit 40(1,1), the AD conversion unit 40(1,3), the AD conversion unit 40(3,1), and the AD conversion unit 40(3,3) as shown in FIG. 8. Moreover, the reading control unit 60 turns off the switches SW2*a* to SW2*h*.

The reading control unit 60 causes each of the AD conversion unit 40(1,1), the AD conversion unit 40(1,3), the AD conversion unit 40(3,1), and the AD conversion unit 40(3,3) to perform AD conversion on an added dark signal. For example, an added dark signal input to the comparison unit 20 of the AD conversion unit 40(1,1) is converted into a digital signal by the AD conversion unit 40(1,1) as schematically shown by an arrow 91*a*, and stored in the storage unit 25 of the AD conversion unit 40(1,1). Moreover, an added dark signal input to the comparison unit 20 of the AD conversion unit 40(1,3) is converted into a digital signal by the AD conversion unit 40(1,3) as schematically shown by an arrow 91*c*, and stored in the storage unit 25 of the AD conversion unit 40(1,3).

At the same time as the AD conversion of a dark signal, the reading control unit 60 reads a digital signal based on a photoelectric conversion signal stored at the time of AD conversion of a previous photoelectric conversion signal from the storage units 25 of each of the AD conversion unit 40(1,2), the AD conversion unit 40(1,4), the AD conversion unit 40(3,2), and the AD conversion unit 40(3,4). For example, as schematically shown by an arrow 92*b*, a digital signal based on an added photoelectric conversion signal is output to the data line 50*b* from the storage unit 25 of the AD conversion unit 40(1,2). Furthermore, as schematically shown by an arrow 92*d*, a digital signal based on an added photoelectric conversion signal is output to the data line 50*d* from the storage unit 25 of the AD conversion unit 40(1,4). After that, in the same manner, the reading control unit 60 sequentially selects AD conversion units 40 for each row, and reads a digital signal based on a photoelectric conversion signal from each of the selected AD conversion units 40.

When an added photoelectric conversion signal is input to the comparison unit 20 of the AD conversion unit 40, the reading control unit 60 turns off each switch SW1 of the AD conversion unit 40(1,1), the AD conversion unit 40(1,3), the AD conversion unit 40(3,1), and the AD conversion unit 40(3,3) as shown in FIG. 9. Furthermore, the reading control unit 60 turns on the switch SW2*a*, the switch SW2*b*, the switch SW2*e*, and the switch SW2*f*.

The reading control unit 60 causes each of the comparison unit 20 of the AD conversion unit 40(1,1) and the storage unit 25 of the AD conversion unit 40(1,2), the comparison unit 20 of the AD conversion unit 40(1,3) and the storage unit 25 of the AD conversion unit 40(1,4), the comparison unit 20 of the AD conversion unit 40(3,1) and the storage unit 25 of the AD conversion unit 40(3,2), and the comparison unit 20 of the AD conversion unit 40(3,3) and the storage unit 25 of the AD conversion unit 40(3,4) to perform AD conversion on an added photoelectric conversion signal. For example, an added photoelectric conversion signal input to the comparison unit 20 of the AD conversion unit 40(1,1) is converted into a digital signal by the comparison unit 20 of the AD conversion unit 40(1,1) and the storage unit 25 of the AD conversion unit 40(1,2) as schematically shown by an arrow 91*b*, and stored in the storage unit 25 of the AD conversion unit 40(1,2). Moreover, an added photoelectric conversion signal input to the comparison unit 20 of the AD conversion unit 40(1,3) is converted into a digital signal by the comparison unit 20 and the AD conversion unit 40(1,3) and the storage unit 25 of the AD conversion unit 40(1,4) as schematically shown by an arrow 91*d*, and stored in the storage unit 25 of the AD conversion unit 40(1,4).

At the same time as AD conversion of a photoelectric conversion signal, the reading control unit 60 reads a digital signal based on a dark signal stored at the time of the AD conversion of a previous dark signal from the storage units 25 of each of the AD conversion unit 40(1,1), the AD conversion unit 40(1,3), the AD conversion unit 40(3,1), and the AD conversion unit 40(3,3). For example, as schematically shown by an arrow 92*a*, a digital signal based on an added dark signal is output to the data line 50*a* from the storage unit 25 of the AD conversion unit 40(1,1). Furthermore, as schematically shown by an arrow 92*c*, a digital signal based on an added dark signal is output to the data line 50*c* from the storage unit 25 of the AD conversion unit 40(1,3). After that, in the same manner, the reading control unit 60 sequentially selects AD conversion units 40 for each row, and reads a digital signal based on a photoelectric conversion signal from each of the selected AD conversion units 40.

In this manner, in the third reading method, the reading control unit 60 controls the switch SW1 and the switch SW2 to perform AD conversion using different storage units 25 depending on whether AD conversion of a dark signal is performed or AD conversion of a photoelectric conversion signal is performed. As a result, the imaging element 3 can perform AD conversion of a pixel signal and reading of a pixel signal converted into a digital signal to the data line 50 in parallel. For this reason, a pixel signal can be read in a short time.

(Comparison in First to Third Reading Methods of Addition Reading Processing)

FIG. 10 is a diagram which compares the first to third reading methods of the addition reading processing of the imaging element according to the first embodiment. FIG. 10(*a*) shows the processing in the case of the first reading method, FIG. 10(*b*) shows the processing in the case of the second reading method, and FIG. 10(*c*) shows the processing in the case of the third reading method. Moreover, in FIGS. 10(*a*) to 10(*c*), reading processing of a dark signal from the pixel 10, AD conversion processing of a dark signal, reading processing of a digital signal based on a dark signal, reading processing of a photoelectric conversion signal from the pixel 10, AD conversion processing of a photoelectric conversion signal, and reading processing of a digital signal based on a photoelectric conversion signal are shown side by side on the same time axis.

In the case of the second reading method of FIG. 10 (*b*), as described above, the reading control unit 60 sequentially selects AD conversion units 40 for each two rows and reads a digital signal based on a dark signal and a digital signal based on a photoelectric conversion signal. For this reason, the reading control unit 60 can read the digital signal based on a dark signal from each AD conversion unit 40 in about ½ time and can also read the digital signal based on a photoelectric conversion signal from each AD conversion unit 40 in about ½ time as compared with the case of the first reading method of FIG. 10(*a*). As a result, the imaging element 3 can improve a frame rate at the time of photography.

In the case of the third reading method of FIG. 10 (*c*), as described above, the reading control unit 60 performs the AD conversion of a dark signal (or a photoelectric conversion signal) read from a pixel and reading of a photoelectric conversion signal converted into a digital signal (or a dark signal) in parallel. Therefore, the imaging element 3 can further improve the frame rate at the time of photography as compared with the case of the second reading method of FIG. 10(*b*).

It is considered to provide a storage unit for AD conversion and a storage unit for reading a signal to the data line 50 separately for each pixel 10, but, in this case, an area of the imaging element will increase. In the present embodiment, it is not necessary to separately provide the storage unit for AD conversion and the storage unit for reading a signal to the data line 50, and thus it is possible to prevent the area of the imaging element from increasing.

According to the embodiment described above, the following effects can be obtained.

(1) The imaging element 3 includes a first photoelectric conversion unit 11 and a second photoelectric conversion unit 11 that generate electric charges by photoelectric conversion, a first comparison unit 20 that outputs a first signal based on a result of comparing a signal based on the electric charges generated by the first photoelectric conversion unit 11 with a reference signal, a first storage unit 25 that stores a signal based on the first signal that is output from the first comparison unit 20, a second comparison unit 20 that outputs a second signal based on a result of comparing a signal based on the electric charges generated by the second photoelectric conversion unit 11 with the reference signal, a second storage unit 25 that stores a signal based on the second signal that is output from the second comparison unit 20, a first connection unit (the switch SW2) capable of connecting or disconnecting the first comparison unit 20 and the second storage unit 25, and a control unit (a reading control unit) that controls the first connection unit and controls whether the first signal is output to the first storage unit or the second storage unit. Therefore, the reading control unit 60 according to the present embodiment can shorten reading time of a pixel signal by controlling the switch SW2 and performing reading processing of the pixel signal.

(2) In the present embodiment, the imaging element 3 performs the second reading method and the third reading method by controlling the switch SW1 and the switch SW2. As a result, the reading processing of a pixel signal can be performed at a high speed. In addition, a frame rate at the time of capturing an image can be improved.

The following modifications are also within the scope of the present invention, and one or more of modified examples can be combined with the embodiment described above.

Modified Example 1

In the embodiment described above, an example in which the reading control unit 60 performs addition reading processing by adding signals of a plurality of pixels has been described. The reading control unit 60 may perform processing of thinning out pixels of a specific row or column among all the pixels to read a signal (thinning-out reading processing). In the case of thinning-out reading processing, the reading control unit 60 may perform the same reading method as the first to third reading methods described above.

Modified Example 2

In the embodiment described above, an example in which the imaging element 3 is configured by laminating the first substrate 111 and the second substrate 112 has been described. However, the first substrate 111 and the second substrate 112 may not be laminated.

Modified Example 3

In the embodiment described above, an example in which the data line 50 is configured by a plurality of signal lines corresponding to the number of bits of a digital signal output from the AD conversion unit 40 has been described. The data line 50 may be one signal line or an arbitrary number of signal lines.

Modified Example 4

In the embodiment and modified examples described above, an example in which a photodiode is used as a photoelectric conversion unit has been described. However, a photoelectric conversion film (an organic photoelectric film) may be used as the photoelectric conversion unit.

Modified Example 5

The imaging element and the imaging device described in the embodiments and modified examples described above may be applied for cameras, smartphones, tablets, cameras embedded in PCs, in-vehicle cameras, cameras mounted on unmanned aerial vehicles (drones, radio-controlled vehicles, and the like), and the like.

Although various embodiments and modified examples have been described above, the present invention is not limited to these contents. Other aspects considered within the scope of the technical idea of the present invention are also included within the scope of the present invention.

The disclosure content of the next priority basic application is incorporated herein as a quotation.

Japanese Patent Application No. 2019-69145 (filed on Mar. 29, 2019)

REFERENCE SIGNS LIST

1 Imaging device
3 Imaging element
4 Control unit
10 Pixel
11 Photoelectric conversion unit
20 Comparison unit
25 Storage unit
40 AD conversion unit
60 Reading control unit

The invention claimed is:

1. An imaging element comprising:
a first photoelectric conversion unit and a second photoelectric conversion unit that generate electric charges by photoelectric conversion;
a first comparison unit that outputs a first signal based on a result of comparing a signal based on electric charges generated by the first photoelectric conversion unit and a reference signal;
a first storage unit that stores a signal based on the first signal that is output by the first comparison unit;
a second comparison unit that outputs a second signal based on a result of comparing a signal based on electric charges generated by the second photoelectric conversion unit and the reference signal;
a second storage unit that stores a signal based on the second signal that is output by the second comparison unit; and
a first connection unit (i) that is provided in an area where the first photoelectric conversion unit and the second photoelectric conversion unit are arranged and (ii) that connects or disconnects the first comparison unit and the second storage unit.

2. The imaging element according to claim 1,
wherein the second storage unit stores a signal based on the first signal when the second storage unit is connected to the first comparison unit by the first connection unit.

3. The imaging element according to claim 1, further comprising:
a control unit that controls the first connection unit and controls whether the first signal is output to the first storage unit or the second storage unit.

4. The imaging element according to claim 3,
wherein the control unit causes the first connection unit to connect the first comparison unit and the second storage unit and causes the first signal to be output to the second storage unit.

5. The imaging element according to claim 3, further comprising:
a second connection unit that connects or disconnects the first comparison unit and the first storage unit; and
a third connection unit that connects or disconnects the second comparison unit and the second storage unit,
wherein the control unit controls the second connection unit and the third connection unit.

6. The imaging element according to claim 5,
wherein the control unit causes the second connection unit to disconnect the first comparison unit and the first storage unit and causes the third connection unit to disconnect the second comparison unit and the second storage unit while the first connection unit connects the first comparison unit and the second storage unit.

7. The imaging element according to claim 5,
wherein the control unit causes the second connection unit to connect the first comparison unit and the first storage unit and causes the third connection unit to connect the second comparison unit and the second storage unit while the first connection unit disconnects the first comparison unit and the second storage unit.

8. The imaging element according to claim 3, further comprising:
a first signal line from which a signal stored in the first storage unit is output; and
a second signal line from which a signal stored in the second storage unit is output,
wherein a signal based on the first signal stored in the second storage unit is output to the second signal line when the first connection unit connects the first comparison unit and the second storage unit.

9. The imaging element according to claim 8,
wherein the control unit causes the first connection unit to connect the first comparison unit and the second storage unit when a signal based on the first signal is output using the second signal line.

10. The imaging element according to claim 8,
wherein a signal based on the first signal stored in the first storage unit is output to the first signal line and a signal based on the second signal stored in the second storage unit is output to the second signal line when the first connection unit disconnects the first comparison unit and the second storage unit.

11. The imaging element according to claim 8,
wherein the control unit causes the first connection unit to disconnect the first comparison unit and the second storage unit when a signal based on the first signal is output using the first signal line and a signal based on the second signal is output using the second signal line.

12. The imaging element according to claim 8, further comprising:
a third photoelectric conversion unit that generates electric charges by photoelectric conversion;
a third comparison unit that outputs a third signal based on a result of comparing a signal based on electric charges generated by the third photoelectric conversion unit and the reference signal; and
a third storage unit that stores a signal based on the third signal that is output by the third comparison unit,
wherein the control unit causes the first connection unit to connect the first comparison unit and the second storage unit and outputs a signal based on the first signal using the second signal line when a signal based on the third signal is output using the first signal line.

13. The imaging element according to claim 12,
wherein the control unit causes the first connection unit to connect the first comparison unit and the second storage unit and outputs a signal based on the first signal stored in the second storage unit to the second signal line when a signal based on the third signal stored in the third storage unit is output to the first signal line.

14. The imaging element according to claim 3, further comprising:
an accumulation unit that accumulates electric charges generated by the first photoelectric conversion unit; and
a reset unit that resets electric charges accumulated in the accumulation unit,
wherein the first comparison unit outputs a fourth signal based on a result of comparing a signal after electric charges accumulated in the accumulation unit are reset and the reference signal, and
the control unit controls the first connection unit and controls whether to output the fourth signal to the first storage unit or the second storage unit.

15. The imaging element according to claim 14,
wherein the control unit causes the first connection unit to connect the first comparison unit and the second storage unit and outputs the fourth signal to the second storage unit when the first signal is output to the first storage unit.

16. The imaging element according to claim 15,
wherein the second storage unit stores a signal based on the fourth signal when the fourth signal is output.

17. The imaging element according to claim 14,
wherein the control unit causes the first connection unit to connect the first comparison unit and the second storage unit and outputs the first signal to the second storage unit when the fourth signal is output to the first storage unit.

18. The imaging element according to claim 17,
wherein the first storage unit stores a signal based on the fourth signal when the fourth signal is output.

19. The imaging element according to claim 1, further comprising:
a first substrate that is provided with the first photoelectric conversion unit and the second photoelectric conversion unit; and
a second substrate that is laminated on the first substrate and is provided with the first storage unit and the second storage unit.

20. An imaging device comprising:
the imaging element according to claim 1; and
a generation unit that generates image data on the basis of a signal output from the imaging element.

21. The imaging element according to claim 1, further comprising
a plurality of conversion units comprising (i) a first conversion unit, which includes the first comparison unit and the first storage unit, and (ii) a second conversion unit, which includes the second comparison unit and the second storage unit, wherein
the plurality of conversion units are provided in a row direction and in a column direction.

22. The imaging element according to claim 21, further comprising
a plurality of photoelectric conversion units including the first photoelectric conversion unit and the second photoelectric conversion unit, wherein
a conversion unit of the plurality of conversion units is provided for each of the plurality of photoelectric conversion units.

* * * * *